(12) United States Patent
Bell (10) Patent No.: US 6,233,104 B1
(45) Date of Patent: May 15, 2001

(54) SYSTEM AND METHOD FOR INTERFACING DATA STORED ON A MAGNETIC STRIP

(75) Inventor: Jacob L. Bell, Ft. Collins, CO (US)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 09/294,239

(22) Filed: Apr. 19, 1999

(51) Int. Cl.[7] .................................................. G11B 25/04
(52) U.S. Cl. ................................ 360/2; 360/51; 235/436; 235/449
(58) Field of Search ............................. 360/2, 51, 63; 235/380, 436, 449

(56) References Cited

U.S. PATENT DOCUMENTS

| | | | |
|---|---|---|---|
| 4,680,732 | * | 7/1987 | DiCenzo ................................ 364/900 |
| 4,794,642 | * | 12/1988 | Arbabzadah et al. ............... 379/200 |
| 5,452,143 | * | 9/1995 | Kamagami ............................... 360/2 |
| 5,455,408 | * | 10/1995 | Urata et al. ............................. 360/2 |

* cited by examiner

Primary Examiner—Alan T. Faber (57) ABSTRACT

A magnetic strip interface reads data from a first track and a second track of a magnetic strip. The magnetic strip interface transmits the data read from the first track to a first data handler, which converts this data into a first data word, and the magnetic strip interface also transmits the data read from the second track to a second data handler, which converts this data into a second data word. The first and second data handlers transmit the first and second data words, respectively, to a multiplexer in response to command signals transmitted from a control mechanism. The multiplexer transmits the first and second data words received from the first and second data handlers, respectively, in response to control signals transmitted from the control mechanism. The control mechanism analyzes a priority scheme to determine the timing of transmissions from the data handlers.

22 Claims, 5 Drawing Sheets

SYSTEM AND METHOD FOR INTERFACING DATA STORED ON A MAGNETIC STRIP

BACKGROUND OF THE INVENTION

1. Field of the Invention

The present invention generally relates to data processing techniques and, in particular, to a system and method for reading data from a magnetic strip and for interfacing the data with electrical systems.

2. Related Art

It is often desirable to store information on a magnetic strip located on a plastic card or other device. For example, a magnetic strip; also known as a magnetic stripe, is typically located on the back of a credit card. The credit card is swiped through a card reader that reads information from the magnetic strip and processes the data from the magnetic strip through techniques well known in the art.

Many credit cards include three rows or tracks of data within the magnetic strip. Therefore, the card reader often includes three separate reading devices that read information from a respective track of the magnetic strip. Each reading device serially transmits the data read from the magnetic strip to a computer system that processes the data. In this regard, each reading device transmits a notification signal to the computer system prior to reading data from the magnetic strip. In response to the notification signal, the computer system prepares to receive data After the notification signal is transmitted, the reading device serially transmits the data read from the magnetic strip to the computer system.

Serial transmission is inefficient because it takes a relatively long time to transmit the data bit by bit to the computer system. Furthermore, the computer system is usually required to respond to the notification messages from the reading devices even if there are other tasks that need to be performed by the computer system. If the computer system does not respond to a notification message in a timely fashion, then data could be lost. As a result, many computer systems are designed to immediately respond to notification messages from the reading devices even though it may be more efficient for the computer system to perform other tasks before receiving data from the reading devices.

Further decreasing the efficiency of the computer system is the fact that the computer system is usually required to receive data from each reading device separately. Therefore, the computer system is usually required to manage the reception of three separate and sometimes simultaneous flows of data from the reading devices.

Thus, a heretofore unaddressed need exists in the industry for providing a system and method of efficiently interfacing data read from a magnetic strip. It is desirable that the interface system be integrated so that an external computer system does not have to manage separate flows of data. It is further desirable for the interface system to transmit the data from the magnetic strip in parallel (i.e., via data words) so that the amount of time required to transmit the data is reduced.

SUMMARY OF THE INVENTION

The present invention overcomes the inadequacies and deficiencies of the prior art as discussed hereinbefore. In general, the present invention provides a system and method for interfacing data read from a magnetic strip.

The present invention utilizes a magnetic strip interface, a first data handler, a second data handler, and a control mechanism. The magnetic strip interface reads data from a first track and a second track of a magnetic strip. The magnetic strip interface transmits the data read from the first track to the first data handler, which converts this data into a first data word, and the magnetic strip interface also transmits the data read from the second track to the second data handler, which converts this data into a second data word. The first and second data handlers transmit the first and second data words, respectively, in response to command signals transmitted from the control mechanism.

In accordance with another feature of the present invention the first and second data handlers transmit the first and second data words, respectively, to a multiplexer in response to the command signals. The multiplexer transmits the first and second data words received from the first and second data handlers, respectively, in response to control signals transmitted from the control mechanism.

In accordance with another feature of the present invention, the control mechanism utilizes a priority scheme to control when the first and second command signals are transmitted to the data handlers. The priority scheme may be based on various factors including the amount of data stored in each of the tracks of the magnetic strip.

In accordance with another feature of the present invention, the first and second data handlers respectively define headers in the first and second data words to indicate the track from which the first and second data words are read.

The present invention can also be viewed as providing a method for interfacing data from magnetic strips. Briefly described, the method can be broadly conceptualized by the following steps: reading data from a first track of a magnetic strip; reading data from a second track of a magnetic strip; converting the data from the first track into a first data word; converting the data from the second track into a second data word; transmitting the first data word; transmitting the second data word; and controlling which of the transmitting steps to perform first.

Other features and advantages of the present invention will become apparent to one skilled in the art upon examination of the following detailed description, when read in conjunction with the accompanying drawings. It is intended that all such features and advantages be included herein within the scope of the present invention and protected by the claims.

BRIEF DESCRIPTION OF THE DRAWINGS

The invention can be better understood with reference to the following drawings. The elements of the drawings are not necessarily to scale relative to each other, emphasis instead being placed upon clearly illustrating the principles of the invention. Furthermore, like reference numerals designate corresponding parts throughout the several views.

DETAILED DESCRIPTION OF THE PREFERRED EMBODIMENT

Figure 1:
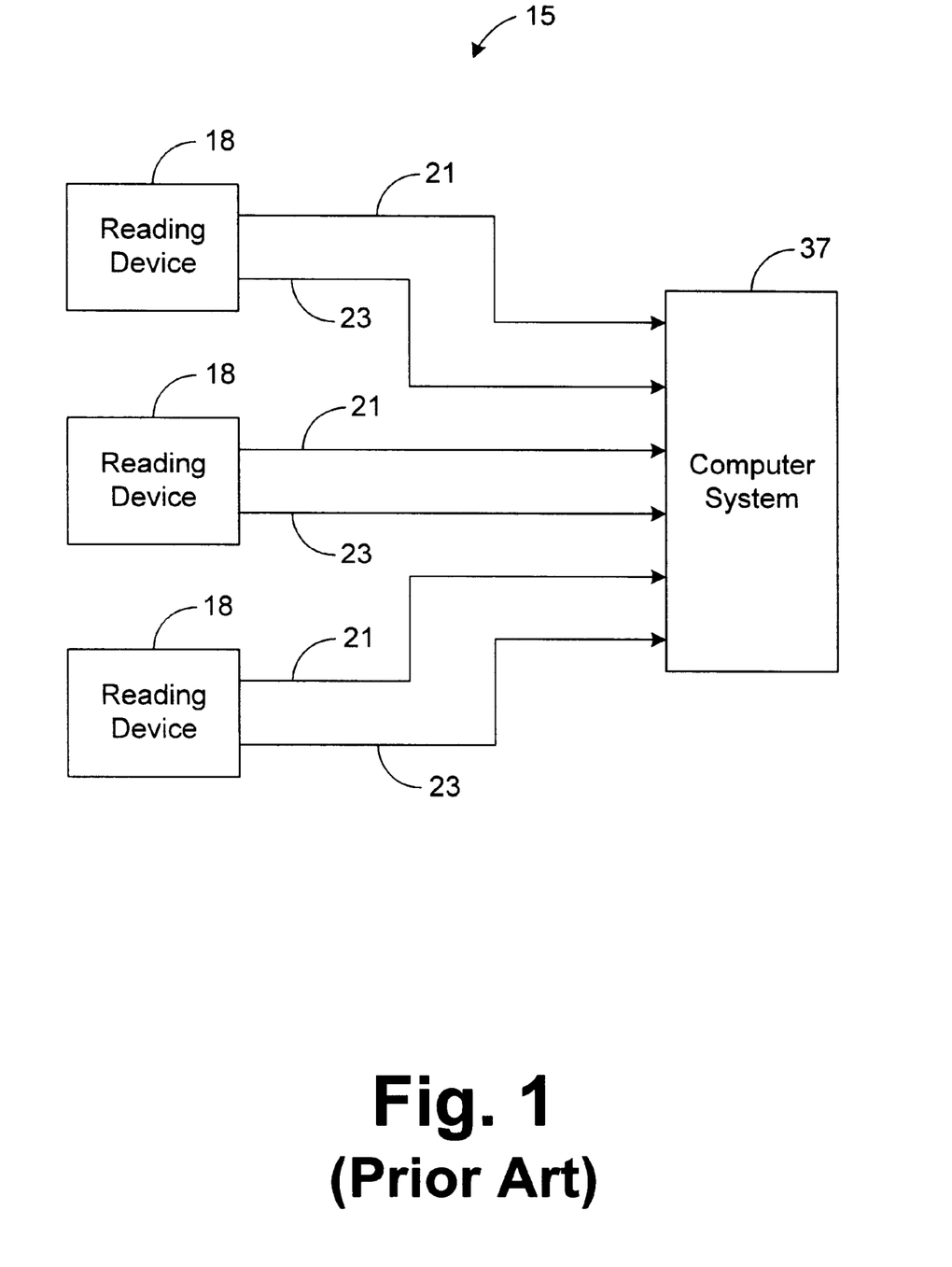
FIG. 1 is a block diagram illustrating a conventional magnetic strip reading system.

FIG. 1 depicts a magnetic strip reading system 15 of the prior art. The reading system 15 includes reading devices 18, which are each capable of reading a track of a magnetic strip. Therefore, the system 15 depicted by FIG. 1 is capable of reading up to three tracks of a magnetic strip. Each reading device 18 separately interfaces data from a respective track of the magnetic strip with a computer system 27. In this regard, each reading device 18 serially transmits a data signal 21 and a clock signal 23 to the computer system 27, which processes the data signal 21 and clock signal 23 through known techniques. The data signal 21 and the clock signal 23 are defined by data read from the magnetic strip.

Figure 2:
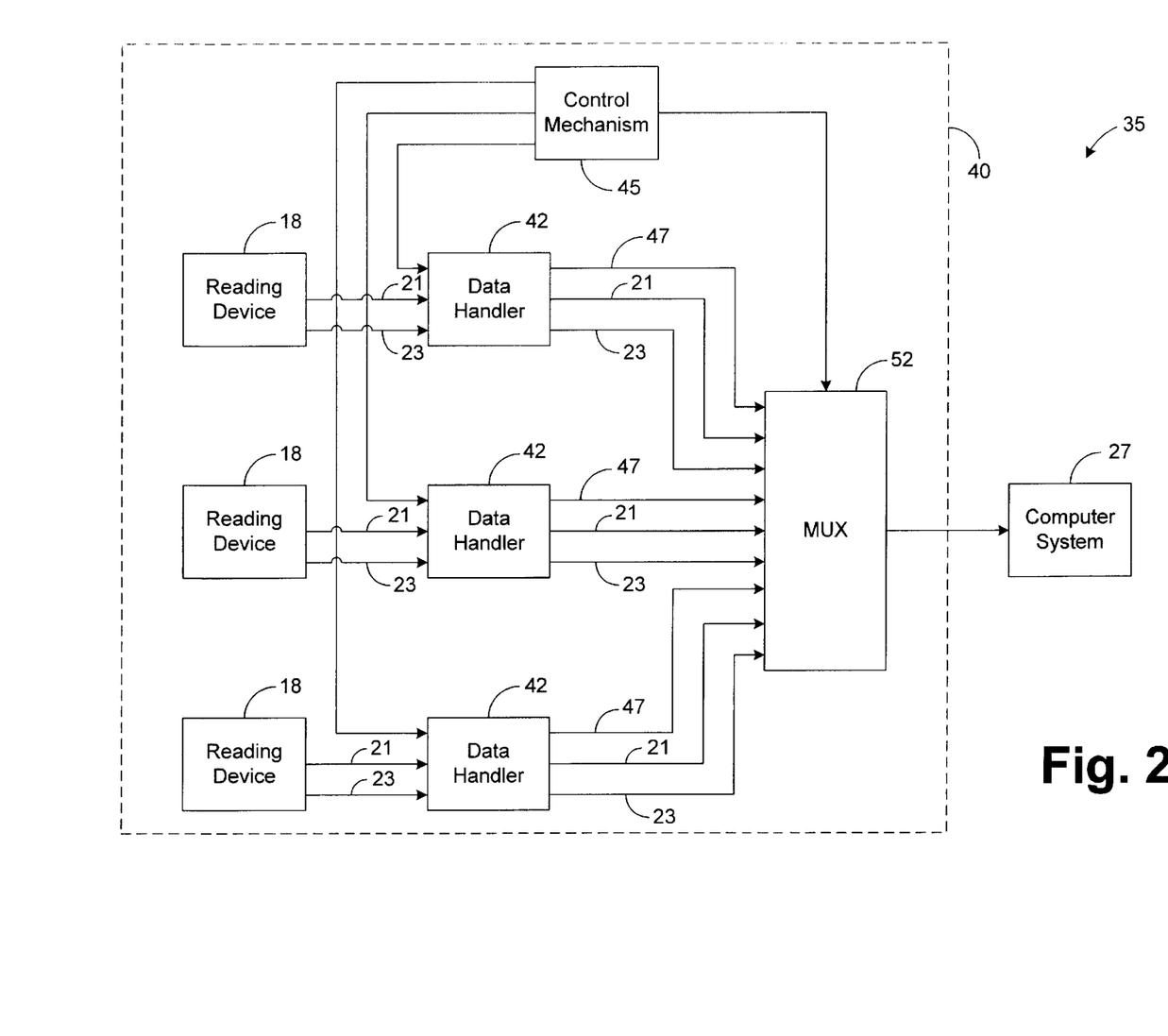
FIG. 2 is a block diagram illustrating a magnetic strip reading system in accordance with the principles of the present invention.

FIG. 2 shows an embodiment of a magnetic strip reading system 35 in accordance with the present invention. The system 35 includes a computer system 37 and an integrated interface system 40 that interfaces data from a magnetic strip with the computer system 37. The interface system 40 includes data handlers 42 respectively connected to each reading device 18. Each data handler 42 is designed to receive the data signal 21 and clock signal 23, which are serial signals, and to transmit data word signals 47 to a multiplexer 52. Each data word signal 47 is defined by a plurality of bits from the data signals 21.

A control mechanism 45 is configured to control the operation of the data handlers 42 and to prioritize the transmission of data to the computer system 37. In the preferred embodiment, the control mechanism 45 is implemented in hardware. However, the control mechanism 45 can also be implemented in software or a combination of hardware and software. When implemented in software, as illustrated by way of example in FIG. 3, the control mechanism 45 of the present invention along with its associated methodology is stored in computer memory 55 of a computer system 58.

Note that the control mechanism 45, when implemented in software, can be stored and transported on any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (magnetic), a read-only memory (ROM) (magnetic), an erasable programmable read-only memory (EPROM or Flash memory) (magnetic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory. As an example, the control mechanism 45 may be magnetically stored and transported on a conventional portable computer diskette.

Figure 3:
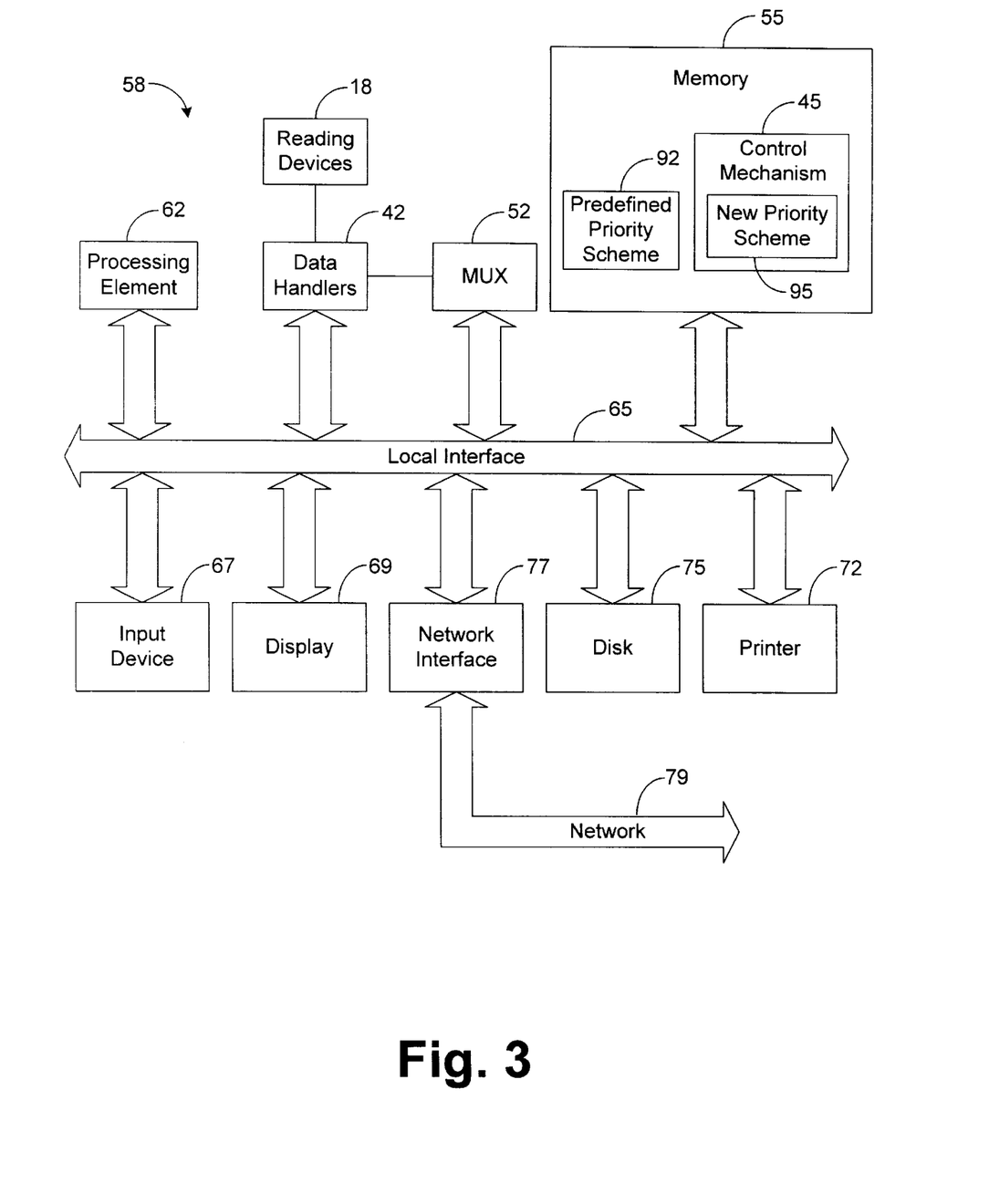
FIG. 3 is a block diagram illustrating a computer system employing the interfacing system of FIG. 2.

The computer system 58 of FIG. 3 comprises one or more conventional processing elements 62, such as a digital signal processor (DSP), that communicate to and drive the other elements within the system 58 via a local interface 65, which can include one or more buses. Furthermore, an input device 67, for example, a keyboard or keypad, can be used to input data from a user of the system 58, and display 69, such as a liquid crystal display (LCD), or a printer 72 can be used to output data to the user. A disk storage mechanism 75 can be connected to the local interface 65 to transfer data to and from a nonvolatile disk (e.g., magnetic, optical, etc.). The system 58 can be connected to a network interface 77 that allows the system 58 to exchange data with a network 79.

Referring again to FIG. 2, the reading devices 18, through techniques well known in the art, act as an interface data between a magnetic strip and the data handlers 42. In this regard, the reading devices 18 are designed to read data from a magnetic strip, such as the magnetic strips located on the back of credit cards, automatic teller machine (ATM) cards, etc. Each reading device 18 is configured to transmit a serial data signal 21 and clock signal 23 to a respective data handler 42. The data signals 21 and the clock signals 23 represent data read from the magnetic strip.

Figure 4:
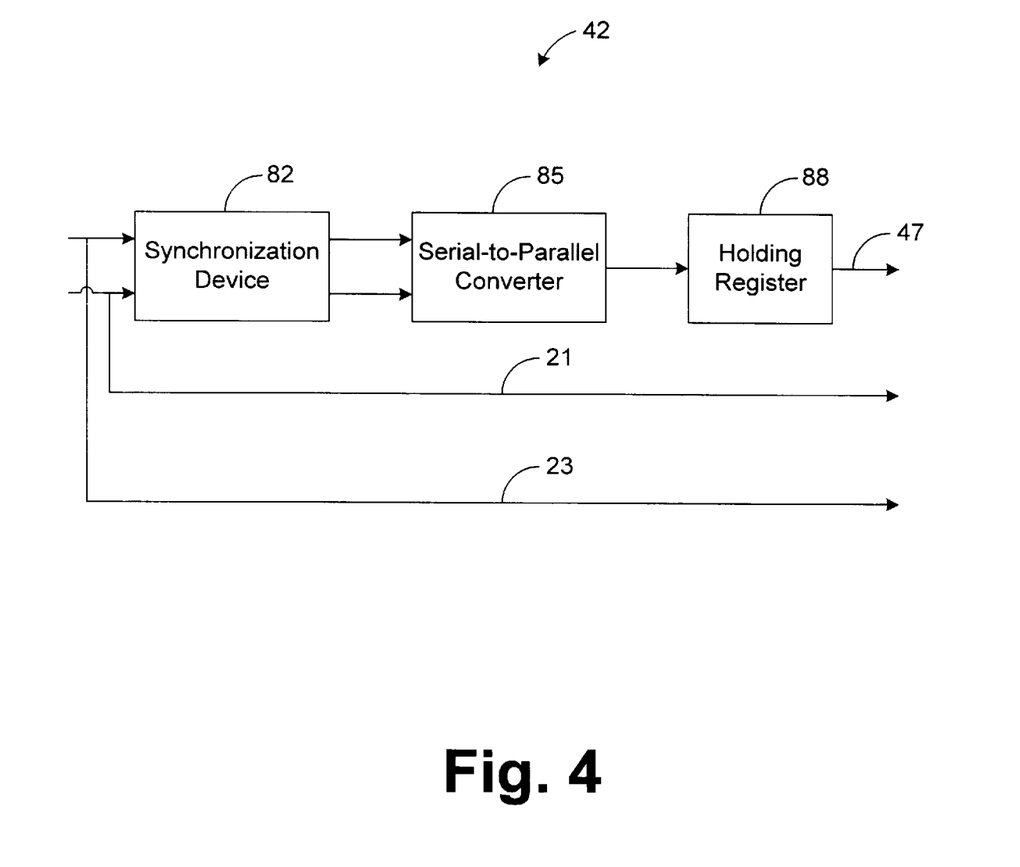
FIG. 4 is a block diagram illustrating the data handlers shown in FIG. 2.

FIG. 4 depicts a more detailed view of each data handler 42. Each of the data handlers 42 includes a synchronizing device 82, a serial-to-parallel converter 85, and a holding register 88. The synchronizing device 82 is designed to synchronize the data signal 21 and the clock signal 23 with the timing of the data handler 42. Once the data signal 21 and clock signal 23 are synchronized with the data handler 42, the synchronizing device 82 is configured to transmit the data signal 21 and the clock signal 23 to the serial-to-parallel converter 85.

The serial-to-parallel converter 85 is configured to receive and store each bit of the data signal 21 transmitted from synchronizing device 82. The serial-to-parallel converter 85 is also designed to convert the serial data signal 21 from serial to parallel. In this regard, the serial-to-parallel converter 85 uses the data received from signals 21, which have been synchronized with the data handler 42 by the synchronization device 82, to form a data word. As used herein, a data word is a collection of data bits and can comprise any number of data bits. When a data word is defined, the serial-to-parallel converter 85 is designed to transmit the data word to holding register 88.

In the preferred embodiment, the serial-to-parallel converter 85 transmits a notification signal to the control mechanism 45, when the serial-to-parallel converter 85 has received enough bits to define a data word. Therefore, the control mechanism 45 is aware when the serial-to-parallel converter 85 has defined a new data word. In response to the notification signal, the control mechanism 45 is designed to transmit a command signal to the serial-to-parallel converter 85 instructing the serial-to-parallel converter 85 to transmit the newly defined data word to holding register 88. In response to the command signal from control mechanism 45, the serial-to-parallel converter 85 is designed to transmit the newly defined data word to the holding register 88.

It should be noted that the serial-to-parallel converter 85 may be designed in other embodiments to transmit each newly defined data word to the holding register 88 without receiving commands from the control mechanism 45. However, in such an embodiment, it is still desirable for a notification message to be transmitted to the control mechanism 45 indicating when a new data word has been defined so that the control mechanism 45 is aware when data is ready for transmission to the computer system 37. It is possible for this notification message to be transmitted to the control mechanism 45 from other devices, such as the holding register 88, for example.

Furthermore, the serial-to-parallel converter 85 preferably includes circuitry for detecting the occurrence of a data overrun. A data overrun can occur when data from reading device 18 overwrites data previously received by the serial-to-parallel converter 85 before the previously received data has been transmitted to the holding register 88. When a data overrun is detected, the serial-to-parallel converter 85 is configured to transmit a notification signal to the control mechanism 45 to indicate the occurrence of the overrun. In response, the control mechanism is designed to transmit an interrupt signal, or other type of notification signal, to the computer system 37 to make the computer system 37 aware that the data being transmitted to the computer system 37 may be corrupted.

Upon receiving a newly defined data word from the serial-to-parallel converter 85, the holding register 88 is preferably configured to include a header on each data word to identify which track of the magnetic strip the data word is associated with. For example, assume that the magnetic strip includes three tracks of information such that each of the data handlers 42 corresponds to a respective track (i.e., each of the data handlers 42 processes data from a respective track of the magnetic strip). In the preferred embodiment, the holding register 88 corresponding with the first track ("track 1") inserts and asserts a header bit into each data word associated with track 1. Therefore, if a data word has an asserted header bit, then the data word is defined by data from track 1. The holding register 88 corresponding with the second track ("track 2") inserts and deasserts two header bits into each data word associated with track 2, and the holding register 88 corresponding with the third track ("track 3") inserts two header bits into each data word associated with track 3. The holding register 42 corresponding with the third track asserts the first header bit and deasserts the next header bit. Preferably the inserted header bits for each of the tracks are located at the most significant bit(s) location in each data word. Therefore, each data word having the most significant bit asserted is defined by data from track 1. Furthermore, each data word having the two most significant bits deasserted is defined by data from track 2, and each data word having the most significant bit deasserted and the next most significant bit asserted is defined by data from track 3.

It should be appreciated by one skilled in the art that other techniques and/or other types of headers may be employed to identify the track associated with each data word without departing from the principles of the present invention. Furthermore, the header included in each data word may be comprised of different values, may include a different number of bits, and may be positioned in different locations within the data words.

The holding register 88 is preferably designed as a first in, first out (FIFO) device. Therefore, the holding register 88 is configured to receive and store the parallel data words transmitted from the serial-to-parallel converter 85. In response to a transmit command from control mechanism 45, the holding register 88 is designed to transmit a data word to multiplexer 52 as signal 47. Since the holding register 88 is preferably a FIFO device, the data words are transmitted by the holding register 88 in the same order that the data words were received by the holding register 88. Therefore, the first data word received by the holding register 88 is the first data word transmitted by the holding register 88.

The control mechanism 45 is configured to prioritize the transmission of data from the data handlers 42. In this regard, a predefined priority scheme 92 may be hardcoded in hardware or may be stored in memory 55. As used herein, the term "predefined" or "predetermined" is relative to the data being processed by the system 35 and shall be defined to mean as determined or defined before the data being processed by the system 40 is read from the magnetic strip. The predefined priority scheme 92 indicates which data handler 42 should be given priority (i.e., be allowed to transmit data to the multiplexer 52 first) when more than one data handler 42 is simultaneously ready to transmit data to the multiplexer 52. In the preferred embodiment, the data handler 47 that is processing a larger amount of data is given a higher priority. Therefore, the data handler 47 with the largest of amount of data to transmit per stripe is selected as the data handler 42 with the highest priority.

For example, in credit card applications, it is common to include three tracks of information on a magnetic strip associated with a credit card. Each respective track on the magnetic strip includes approximately the same amount of information from card to card. For example, assume that each track on each credit card includes the amount of data shown by Table 1:

TABLE 1

| Track Number | Priority | Bits/Inch (bpi) | Number of Bits in the Header | Bits/Data Word |
|---|---|---|---|---|
| 1 | 2 | 210 | 1 | 7 |
| 2 | 3 | 75 | 2 | 6 |
| 3 | 1 | 210 | 2 | 6 |

As can be seen by referring to Table 1, the data handler 42 associated with track 3 is required to transmit the most data for each swipe of the credit card and is assigned the highest priority ("priority 1") as a result. Note that although track 1 and track 3 include the same amount of data, the data handler 42 associated with track 3 transmits more data because it has a two bit header instead of a one bit header, as described hereinbefore. Therefore, assuming that each data word transmitted from the holding register 88 is 8 bits in length, the data words associated with track 1 include 7 bits of data from the magnetic strip, whereas the data words associated with tracks 2 and 3 include only 6 bits of data from the magnetic strip. It should be noted that the number of bits defining the data words can vary without departing from the principles of the present invention.

Furthermore, the data handler 42 associated with track 1 is required to transmit more data than the remaining data handler 42 (i.e., the data handler 42 associated with track 2) and is, therefore, assigned the next highest priority ("priority 2"). The data handler 42 associated with track 2 transmits the least amount of data for each swipe of the credit card and is, therefore, assigned the lowest priority ("priority 3").

When the control mechanism 45 determines, based on the aforementioned notification signals transmitted to the control mechanism 45 by the serial-to-parallel converter 85, that one of the data handlers 42 is ready to transmit data to the multiplexer 52, the control mechanism 45 is designed to then determine whether there is more than one data handler 42 that is ready to transmit data. If there are no other data handlers 42 ready to transmit data, then the control mechanism 45 is designed to transmit a command signal to the holding register 88 of the data handler 42 that is ready to transmit data. In response, the holding register 88 transmits a data word to the multiplexer 52 as data signal 47. However, if there are other data handlers 42 ready to transmit data as well, then the control mechanism 45 is designed to select the data handler 42 with the highest priority of the data handlers 42 that are ready to transmit data. The control mechanism 45 is then designed to transmit the command signal to the holding register 88 of the selected data handler 42. In response, the holding register 88 of the selected data handler 42 transmits a data word to the multiplexer 52 as data signal 47.

After the control mechanism 45 transmits a control signal to the appropriate holding register 88, the control mechanism 45 is designed to determine if there are any data handlers 42 ready to transmit data. If there is a data handler 42 ready to transmit data at this point, the control mechanism 45 is designed to change the current priority scheme (i.e., the priority scheme previously used to determine priority, which is the predefined priority scheme 92 in this example) to create a new priority scheme 95 (FIG. 3). In this regard, the new priority scheme 95 corresponds to the current priority scheme, except that the data handler 42 that just transmitted data to the multiplexer 52 (i.e., the last data handler 42 to transmit data to the multiplexer 52) is assigned the lowest priority. This is to ensure that the data handlers 42 having the higher priority according to the predetermined priority scheme 92 are not serviced so often at the expense of lower priority data handlers 42 to cause an overrun of data in the lower priority data handlers 42. It should be noted that the predefined priority scheme 92 and the new priority scheme 95 may be defined in hardware, software, or a combination thereof.

Once the new priority scheme 95 is defined, the control mechanism 45 is configured to select the data handler 42 with the highest priority (based on the new priority scheme 95) of the data handlers 42 ready to transmit data. Then, the control mechanism 45 is designed to transmit a command signal to the holding register 88 of the selected data handler 42 to cause this holding register 88 to transmit data. If the control mechanism 45 determines that there are no data handlers 42 currently ready to transmit data, then the control mechanism 45 takes no further action until another notification message is received. Once this occurs, the control mechanism 45 is designed to use the predetermined priority scheme 92 again to determine priority between the data handlers 42 that are simultaneously ready to transmit data.

The multiplexer 52 preferably receives control signals from the control mechanism 45, and based on these control signals, the multiplexer 52 is designed to multiplex the data word signals 47. In this regard, the mulitplexer 52, based on the control signals received from control mechanism 45, selects one of the data word signals 47 to transmit to computer system 37 in the preferred embodiment. Therefore, the bus(es) connecting the multiplexer 52 with each of the data handlers 42 and the bus connecting the multiplexer 52 with the computer system 37 should correspond to the number of bits included in the data word signals 47 transmitted from the data handlers 42. For example, if the data handlers 42 are designed to transmit 8 bit data words, then the foregoing buses should correspond to 8 bit connections.

It should be noted that the multiplexer 52 is not a necessary feature of the present invention. In alternative embodiments, each data handler 42 can be coupled directly to and transmit data signals 47 directly to the computer system 37. However, such a non-integrated configuration would require the computer system 37 to handle reception of data signals 47 from separate sources (i.e., from each of the data handlers 42). This is generally undesirable since it increases the complexity and number of processing tasks of the computer system 37.

Although it is preferable for the data transmitted from the data handlers 42 to be in parallel digital word format, as described hereinabove, it is possible for the data to be transmitted serially, if desired. In this regard, the control mechanism 45 is preferably designed to determine when serial transmission is desired. For example, the computer system 37 can be designed to transmit a signal to control mechanism 45 to indicate that the computer system 37 expects to receive data serially. In response, the control mechanism 45 is designed to transmit control signals to multiplexer 52 instructing multiplexer 52 to select signals 21 and 23 from each of the data handlers 42 for transmission to computer system 37. The control mechanism 45 is further designed to ignore notification signals from serial-to-parallel converter 85 and to refrain from transmitting command signals to holding register 88. Therefore, the data handlers 42 are effectively bypassed, and the system 35 operates similar to the prior art system 15.

It should be further noted that computer system 37 is not a necessary feature of the present invention. Accordingly, the system 35 can interface the data from the magnetic strip to other devices or systems without departing from the principles of the present invention. For example, in some applications, is may be desirable to interface the data with a direct memory access (DMA), which in turn interfaces the data with the computer system 37.

Furthermore, the control mechanism 45 may be configured to disable any of the reading devices 18 and/or data handlers 42, if desired. The reading devices 18 and/or data handlers 42 may be disabled through a variety of techniques, such as, for example, by turning the power or clock off to these devices. For example, the system 35 may be utilized in applications where a magnetic strip has less tracks than the number of reading devices 18 and the number of data handlers 42. Accordingly, the reading devices 18 and data handlers 42 not utilized to read and process data in these applications may be powered down to conserve power and/or to reduce noise in the system 35.

OPERATION

The preferred use and operation of the magnetic strip interfacing system 35 and associated methodology are described hereafter.

Assume, for illustrative purposes, that system 35 is to read a magnetic strip having three tracks (track 1, track 2 and track 3) of information, and that the amount of data per inch on each track is indicated by Table 1, hereinabove. Therefore, a predefined priority scheme 92 assigns the highest priority to track 3, the next highest priority to track 1, and the lowest priority to track 2.

At some point, the magnetic strip is swiped through the reading devices 18. The control mechanism 45, through known techniques, detects when a magnetic strip is being swiped through the reading devices 18 and, therefore, becomes aware that the reading devices 18 are about to start sending information to the data handlers 45. In response, the control mechanism 45 transmits an interrupt signal, or other type of notification signal, to the computer system 37 so that the computer system 37 may prepare to receive data from the interfacing system 35.

As the magnetic strip is swiped through the reading devices 18, the reading devices 18 read the data from each respective track. As the data is read from the magnetic strip, the data and clock from each track is serially transmitted to a serial-to-parallel converter 85. The serial-to-parallel converter 85 converts the data to parallel data words through techniques well known in the art. Then, in block 107 of FIG. 5, the control mechanism 45 determines when a new data word associated with any of the tracks is defined and, therefore, ready to be transmitted.

Figure 5:
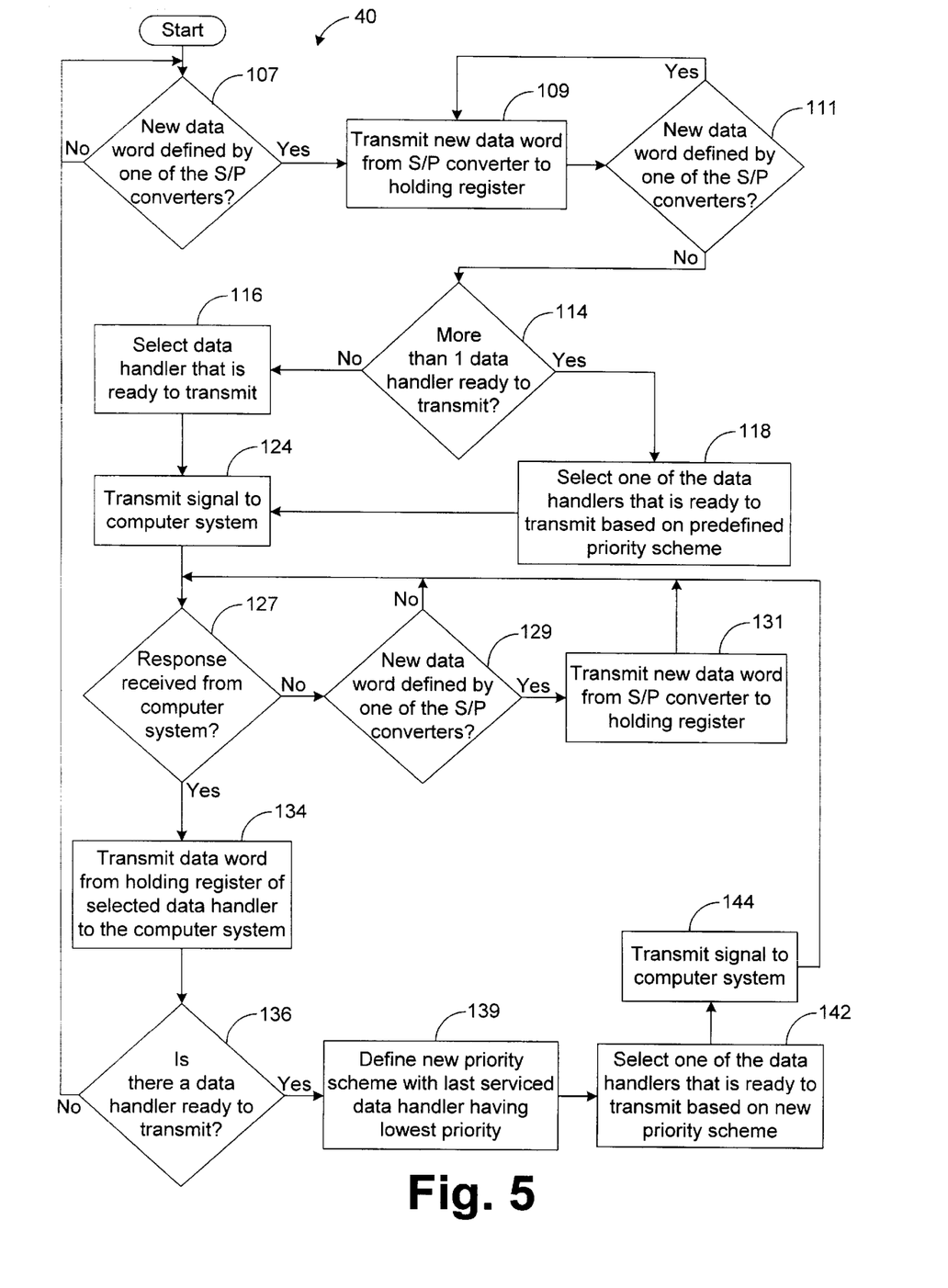
FIG. 5 is a flow chart illustrating the architecture and functionality of the interfacing system of FIG. 2.

In the preferred embodiment, each of the serial-to-parallel converters 85 of the data handlers 42 transmits a notification signal to the control mechanism 45 when enough bits have been received to define a new data word. When a new data word is defined, the control mechanism 45 instructs the serial-to-parallel converter 85 associated with the new data word to transmit the new data word to the data register 88 coupled to this serial-to-parallel converter, as shown by blocks 107 and 109. As, shown by blocks 109 and 111, if more than one new data word is simultaneously defined and ready to be transmitted, then each of the newly defined data words is transmitted to a holding register 88. In the preferred embodiment, the control mechanism 45 transmits a command signal to a serial-to-parallel converter 85 to instruct the serial-to-parallel converter 85 to transmit its newly defined data word. In response, the serial-to-parallel converter 85 transmits the new data word to its respective holding register 88. However, other methodologies for controlling the operation of the serial-to-parallel converters 85 are possible.

After transmitting at least one command signal to the serial-to-parallel converters 85, the control mechanism 45 selects one of the data handlers 42. If there is only one data handler 42 ready to transmit a data word at this point (i.e., has a data word in the holding register 88 associated with the data handler 42), the control mechanism 45 selects the one data handler 42, as depicted by blocks 114 and 116. However, if there is more than one data handler 42 ready to transmit a data word, then the control mechanism 45 selects one of the data handlers 42 ready to transmit a data word based on the predefined priority scheme 92, as shown by blocks 114 and 111.

As an example, assume that all three data handlers 42 are simultaneously ready to transmit a respective data word in block 114. Since the data handler 42 that is associated with track 3 (i.e., that receives the data read from track 3) has the highest priority according to the predefined priority scheme 92, the control mechanism 45 selects the data handler 42 that is associated with track 3.

Once the control mechanism 45 selects one of the data handlers 42 in block 116 or 118, the control mechanism 45 transmits an interrupt signal, or other type of notification signal, to computer system 37 to notify the computer system 37 that the interfacing system 40 is ready to transmit a data word, as shown by block 124. Then, the control mechanism 45 waits for the computer system 37 to transmit a reply signal indicating that the computer system 37 is ready to receive a data word, as depicted by block 137.

While the control mechanism 45 is waiting to receive the reply signal from the computer system 37, the control mechanism 45 determines whether any new data words have been defined by any of the serial-to-parallel converters 85, as shown by block 129. If there have been, the control mechanism 45 transmits a command signal to the appropriate serial-to-parallel converter 85 to cause the serial-to-parallel converter 85 to transmit the new data word to its respective holding register 88, as shown by block 131. This helps to prevent data overruns in the serial-to-parallel converters 85 from occurring while the control mechanism 45 is waiting for a reply from the computer system 37. However, if a data overrun does occur, the serial-to-parallel converter 85 preferably detects this event and transmits a notification signal to the control mechanism 45 indicating that a data overrun has occurred. In response, the control mechanism 45 transmits an interrupt signal, or other type of notification signal, to the computer system 37 to indicate the occurrence of the overrun.

Once the reply signal from the computer system 37 is received by the control mechanism 45, the data word associated with the selected data handler 42 (i.e., the data handler 42 processing data from track 3 in the example described hereinabove) is transmitted to the computer system 37, as depicted by block 134. In preferred embodiment, the control mechanism 45 transmits a command signal to the holding register 88 of the selected data handler 42 in response to the reply signal. The holding register 88, in response to the command signal, transmits a data word (i.e., signal 47) to the multiplexer 52. The multiplexer 52, based on control signals from the control mechanism 45, transmits the data word from the holding register 88 of the selected data handler 42 to the computer system 37.

Once the data word is transmitted to the computer system 37, the control mechanism 45 then determines in block 136 whether there are any data handlers 42 ready to transmit a data word. Note that the data words ready to be transmitted can include the data words identified in blocks 107, 111 or 129. In the example described hereinbefore, assume that no new data words have been defined since block 111. As a result, the data handlers 42 associated with tracks 1 and 2 have a respective data word ready to be transmitted. Therefore, the control mechanism 45 defines a new priority scheme 95, as shown by block 139.

In this regard, the control mechanism 45 modifies the current priority scheme (i.e., the priority scheme most recently used to select a data handler 42 in blocks 116, 118 or 142, which in the example described hereinbefore is the predetermined priority scheme 92) such that the last data handler 42 to transmit a data word to the computer system 37 is assigned the lowest priority. Therefore, according to the new priority scheme 95 in the foregoing example, the data handler 42 associated with track 1 has the highest priority, the data handler 42 associated with track 2 has the next highest priority, and the data handler 42 associated with track 3 has the lowest priority.

Based on this new priority scheme 95, the control mechanism 45 selects the data handler 42 that has the highest priority of the data handlers 42 that are ready to transmit a data word to the computer system 37. Therefore, in the foregoing example, the control mechanism 45 selects the data handler 42 associated with track 1 in block 142. Then, similar to block 124, the control mechanism 45 in block 144 transmits an interrupt signal, or other type of notification signal, to computer system 37 to notify the computer system 37 that the interfacing system 40 is ready to transmit a data word. Then, the control mechanism 45 returns to block 137. As a result, a data word is transmitted from the data handler 42 associated with track 1 to the computer system 37 via blocks 137–134.

Assuming that no new data words have been defined since block 111, the data handler 42 associated with track 2 is now the only data handler 42 with a data word to be transmitted. As a result, the new priority scheme 95 is modified in block 139 such that the data handler 42 associated with track 2 has the highest priority, the data handler associated with track 3 has the next highest priority, and the data handler 42 associated with track 1 has the lowest priority. In block 142, the control mechanism 45 selects the data handler 42 associated with track 2 based on this new priority scheme 95 and returns to blocks 124 and 137. As a result, a data word from the data handler 42 associated with track 2 is transmitted to the computer system 37 via blocks 137–134.

Assuming that no new data words have been defined since block 111, none of the data handlers 42 now have a data word ready to be transmitted. Therefore, the control mechanism 45 returns to block 107, and the foregoing process is repeated.

It should be noted that blocks 124–131 are not necessary for implementation of the present invention. In this regard, it is possible for the interfacing system 40 to transmit data words to the computer system 37 without waiting for a reply signal from the computer system 37. However, without blocks 124 and 137, the computer system 37 will be unable to control when the data words are transmitted to the computer system 37. This lack of control by the computer system 37 is undesirable in many applications.

Furthermore, although the priority schemes 92 and 95 of the present invention are based on the amount of data in each track of the magnetic strip, it is possible to base priority schemes 92 and 95 on other factors. It is even possible to arbitrarily assign priority in the predefined priority scheme 92, if desired.

In addition, although the preferred embodiment depicts three reading devices 18, the present invention should not be so limited. Any number (one or more) of reading devices 18 and corresponding data handlers 42 may be employed without departing from the principles of the present invention.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to) be included herein within the scope of the present invention.

Now, therefore, the following is claimed:

1. A system for interfacing data from magnetic strips, comprising:
   a magnetic strip interface configured to read data from a first track and a second track of a magnetic strip and to transmit the data;
   a first data handler coupled to said magnetic strip interface, said first data handler configured to receive the data read from the first track and to define a first data word based on the data read from the first track, said first data handler further configured to transmit the first data word in response to a first command signal;
   a second data handler coupled to said magnetic strip interface, said second data handler configured to receive the data read from the second track and to define a second data word based on the data read from the second track, said second data handler further configured to transmit the second data word in response to a second command signal; and
   a control mechanism configured to determine, in a first determination, when said first data handler is ready to transmit the first data word and to determine, in a second determination when said second data handler is ready to transmit the second data word, said control mechanism further configured to consecutively transmit the first command signal and the second command signal based on the first and second determinations.

2. The system of claim 1, wherein said control mechanism is configured to receive a notification signal and to transmit at least one of the first command signal and the second command signal in response to the notification signal.

3. The system of claim 1, wherein the first data handler further comprises:
   a serial-to-parallel converter configured to receive the data read from the first track and to transmit the first data word based on the data received by said serial-to-parallel converter; and
   a first in, first out (FIFO) device configured to receive the first data word from said serial-to-parallel converter and, in response to the first command signal, to transmit the first data word.

4. The system of claim 3, wherein said serial-to-parallel converter is configured to transmit a signal to said control mechanism, and wherein the signal transmitted by said serial-to-parallel converter indicates that said serial-to-parallel converter is ready to transmit the first data word.

5. The system of claim 1, wherein said first data handler is further configured to define a header in the first data word, the header indicating that the data defining the first data word is associated with the first track.

6. The system of claim 1, wherein said control mechanism is configured to ensure that the first and second control signals are transmitted consecutively when said control mechanism determines that said first data handler and said second data handler are simultaneously ready to transmit the first data word and the second data word, respectively.

7. The system of claim 1, wherein said first data handler is configured to transmit a notification signal to said control mechanism when said first data handler is ready to transmit the first data word, and wherein said second data handler is configured to transmit a notification signal to said control mechanism when said second data handler is ready to transmit the second data word.

8. A system for interfacing data from magnetic strips comprising:
   a magnetic strip interface configured to read data from a first track and a second track of a magnetic strip and to transmit the data;
   a first data handler coupled to said magnetic strip interface, said first data handler configured to receive the data read from the first track and to define a first data word based on the data read from the first track, said first data handler further configured to transmit the first data word in response to a first command signal;
   a second data handler coupled to said magnetic strip interface, said second data handler configured to receive the data read from the second track and to define a second data word based on the data read from the second track, said second data handler further configured to transmit the second data word in response to a second command signal;
   a control mechanism configured to transmit the first command signal and the second command signal; and
   a multiplexer coupled to said first and second data handlers, said multiplexer configured to receive the first and second data words and to transmit the first and second data words based on control signals, wherein said control mechanism is further configured to transmit the control signals.

9. The system of claim 8, wherein said magnetic strip interface is coupled to said multiplexer and transmits data serially to said multiplexer.

10. A system for interfacing data from magnetic strips, comprising:
    a magnetic strip interface configured to read data from a first track and a second track of a magnetic strip and to transmit the data;

a first data handler coupled to said magnetic strip interface, said first data handler configured to receive the data read from the first track and to define a first data word based on the data read from the first track, said first data handler further configured to transmit the first data word in response to a first command signal;

a second data handler coupled to said magnetic strip interface, said second data handler configured to receive the data read from the second track and to define a second data word based on the data read from the second track, said second data handler further configured to transmit the second data word in response to a second command signal; and a control mechanism configured to transmit the first command signal and the second command signal, said control mechanism, in response to a determination that said first data handler and said second data handler are simultaneously ready to transmit the first data word and the second data word, respectively, further configured to select one of the first and second data handlers based on a priority between said first data handler and said second data handler, said control mechanism further configured to transmit one of the command signals to the selected data handler before transmitting the other signal to the other data handler.

11. The system of claim 10, wherein the priority is based on an amount of data included in the first track and based on an amount of data included in the second track.

12. A system for interfacing data from magnetic strips, comprising:

a magnetic strip interface configured to read data from a first track and a second track of a magnetic strip and to transmit the data;

a first data handler coupled to said magnetic strip interface, said first data handler configured to receive the data read from the first track and to define a first data word based on the data read from the first track, said first data handler further configured to transmit the first data word in response to a first command signal;

a second data handler coupled to said magnetic strip interface, said second data handler configured to receive the data read from the second track and to define a second data word based on the the data read from the second track, said second data handler further configured to transmit the second data word in response to a second command signal;

a control mechanism configured to transmit the first command signal and the second command signal, said control mechanism further configured to control when the first command signal and the second command signal are respectively transmitted to said first data handler and said second data handler based on a priority scheme.

13. The system of claim 12, wherein the priority scheme is based on which of the tracks includes more data bits.

14. The system of claim 12, wherein the priority scheme indicates that the first track has a higher priority than the second track, and wherein said control mechanism is further configured to change the priority scheme such that the first track has a lower priority than the second track after the first data word has been transmitted by said first data handler.

15. A system for interfacing data from magnetic strips, comprising:

means for reading data from a first track and a second track of a magnetic strip;

means for converting said data from said first track into a first data word and for converting the data from the second track into a second data word;

means for transmitting the first and second data words;

means for assigning a first priority to the first data word and for assigning a second priority to the second data word; and means for controlling said means for transmitting based on the first priority and the second priority.

16. The system of claim 15, wherein the first priority is based on an amount of data included in the first track and the second priority is based on an amount of data included in the second track.

17. The system of claim 15, wherein the first priority and the second priority are predetermined.

18. A method for interfacing data from magnetic strips, comprising the steps of:

reading data from a first track of a magnetic strip;

reading data from a second track of a magnetic strip;

converting the data from the first track into a first data word;

converting the data from the second track into a second data word;

transmitting the first data word;

transmitting the second data word; and selectively controlling which of said transmitting steps to perform first.

19. The method of claim 18, performing said controlling step based on an amount of data included in the first track and an amount of data included in the second track.

20. The method of claim 18, further comprising the step of performing said controlling step based on reading rates for said reading steps.

21. The method of claim 18, further comprising the steps of:

receiving a signal;

indicating with the signal that a computer system is ready to receive data; and performing one of said transmitting steps in response to the signal.

22. The method of claim 18, further comprising the steps of;

defining a first header in the first data word;

associating the first track with the first data word based on the first header;

defining a second header in the second data word; and associating the second track with the second data word based on the second header.

* * * * *